United States Patent [19]

Pitchford

[11] 3,753,752

[45] Aug. 21, 1973

[54] SOIL CONTROL EMULSIONS

[75] Inventor: Armin C. Pitchford, Bartlesville, Okla.

[73] Assignee: Phillips Petroleum Company, Bartlesville, Okla.

[22] Filed: Oct. 26, 1971

[21] Appl. No.: 192,348

[52] U.S. Cl. ............... 106/277, 46/1, 106/287 SS, 252/311.5
[51] Int. Cl. ..... C08h 13/00, C08k 1/62, C09d 3/24
[58] Field of Search................... 106/277, 278, 283, 106/287 SS; 46/1; 252/311.5

[56] References Cited
UNITED STATES PATENTS

| | | | |
|---|---|---|---|
| 1,864,672 | 6/1932 | Rose et al. | 47/9 |
| 2,333,959 | 11/1943 | Smith | 47/9 |
| 2,851,824 | 9/1958 | Campbell | 47/58 |
| 3,061,975 | 11/1962 | Hibshman et al. | 47/9 |
| 3,337,987 | 8/1967 | Bennett | 47/9 |
| 3,432,320 | 3/1969 | Pitchford | 106/277 |
| 3,511,676 | 5/1970 | Conn et al. | 106/280 |

*Primary Examiner*—Joan B. Evans
*Attorney*—Arthur Young, Donald J. Quigg et al.

[57] ABSTRACT

A base oil consisting of asphalt and an aromatic oil is dispersed in an aqueous nonionic emulsifying solution to form an oil-in-water emulsion which is useful as a soil control agent.

2 Claims, No Drawings

SOIL CONTROL EMULSIONS

Environmental control practices are being extended to include almost every phase of domestic, agricultural, and industrial activity. Although the public interest and current news media appear to emphasize atmospheric contamination by automobile exhaust emissions or noxious industrial gases, dust is one of the most universal air-borne offenders. Numerous methods and products are known in the art for controlling dust, particularly on unpaved and rural suburban roads. Early attempts to control dust have included application of various petroleum products to the road surface. These materials include crude oil, used lubricating oil, and slow-curing cutback asphalts. Most of these dust control agents, however, provide only temporary relief during dry seasons as the materials are readily displaced by water and washed from the road surface before subsequent treatments are made. As low-cost asphalt pavements were provided for rural farm-to-market roads, the demand for slow-curing cutbacks as dust-allaying oils has declined. However, other applications are appearing which may result in a high-volume demand for select dust-abatement products.

Such demand for dust control agents continues to exist in certain rural, agricultural and industrial locations, in desert or other low-vegetation areas, and in, for example, unpaved access roads such as those in logging and forest areas.

A dust control agent suitable for the uses above indicated and for other similar uses preferably penetrates the soil to thereby wet and bind the soil particles together to form agglomerates which are either too large or too dense to be transported by wind. This penetrating agent would therefore be more than a crust-forming impervious surface layer which would become ineffective upon displacement or damage to the surface crust, which would thereby expose the untreated soil lying beneath the crust. In addition, the agent should resist displacement by surface water.

These and other problems are solved by this invention wherein a base oil having a sufficiently high specific gravity to resist displacement by surface water is dispersed in a carrier which has sufficient stability to facilitate deep penetration of the base oil into the soil.

It is thus an object of this invention to provide a penetrating soil control emulsion.

It is another object of this invention to provide a dust control agent comprising a bituminous material dispersed in an aqueous nonionic emulsifying solution and a process for the production of said agent.

Other objects, aspects, and the various advantages of this invention will be apparent to one skilled in the art from a reading of the following specification, example, and appended claims.

Thus, in accordance with this invention, I have discovered a penetrating soil control emulsion which is comprised of a base oil and an aqueous nonionic emulsifying solution. The base oil, which is dispersed in the aqueous nonionic emulsifying solution, is a blend of a hard, high specific gravity asphalt and a highly aromatic oil. The emulsifying solution is an aqueous nonionic emulsifying solution which is comprised of water and a nonionic emulsifying agent.

By applying the soil control emulsion of this invention to either dry or moist soil, the base oil which is dispersed in the emulsion penetrates into the soil to a substantial depth and causes the soil particles to agglomerate into large or otherwise dense particles which resist being transported by wind. In addition, the base oil is of sufficiently high specific gravity to resist displacement by surface water. Also, because the soil control emulsion of this invention penetrates, surface crusting is minimized. When utilizing the soil control emulsion of this invention, the quantity of emulsion utilized is dependent upon the depth of penetration required. However, satisfactory penetration is obtained when the quantity of soil control emulsion utilized per square foot of soil treated is in the range of 0.01 to 0.5 gallon emulsion per square foot of soil. This range relates to the quantity of concentrate, that is, undiluted emulsion. Greater penetration can be obtained by dilution of the emulsion with water or wetting the soil to be treated prior to application.

The emulsion of this invention can be applied by any means known in the art, such as, for example, by spraying.

Other ingredients can be introduced into the soil control emulsion of this invention, such as, for example, insecticides, germicides and weed control agents, as required.

The soil control emulsion of this invention effectively facilitates the deep penetration of the viscous base oil into the soil and furthermore, since nonionic oil-in-water emulsions are not sensitive to the particle charge of the substrate, the soil control emulsion of this invention provides maximum penetration and more uniform coating of individual soil particles regardless of soil type or geographic location.

The soil control emulsion of this invention is prepared in an essentially two-step process. In the first step, the base oil consisting of the asphalt and aromatic oil is prepared, and the aqueous nonionic emulsifying solution comprising the water and nonionic emulsifying agent is prepared. Subsequently, in the second step, the base oil is dispersed in the emulsifying solution by means known in the art, for example, by means of a colloid mill.

In preparing the base oil, the asphalt and aromatic oil are combined in the weight ratio of asphalt to aromatic oil in the range of 0.5:1 to 3:1, preferably 1:1 to 2.5:1, parts by weight asphalt per 1 part by weight oil. The asphalt and oil to be combined are heated with stirring at a temperature in the range of 275° to 350°F for a sufficient time to obtain a homogeneous blend. Such a time is ordinarily in the range of 0.5 to 60 minutes.

In the preparation of the aqueous nonionic emulsifying solution, water and a suitable nonionic emulsifying agent are combined in a suitable dispersing means, such as in a colloid mill, in a weight ratio of water to emulsifying agent in the range of 5:1 to 20:1, preferably 9:1 to 16:1, parts by weight water per 1 part by weight emulsifying agent. The mixing of the water and emulsifying agent is preferably conducted at a temperature in the range of 40° to 175°F.

When the soil control emulsion is prepared, the base oil is dispersed in the emulsifying solution by means well known in the art, for example, in the colloid mill. The weight ratio of base oil to emulsifying solution is in the range of 1.25:1 to 3.3:1, preferably 1.4:1 to 1.6:1, parts by weight base oil per 1 part by weight emulsifying solution. The mixing of the base oil with the emulsifying solution is preferably conducted with the base oil at a temperature in the range of 250° to 280°F and the emulsifying solution at a temperature in the range of 60° to 175°F.

The colloid mill is operated for a time sufficient to thoroughly disperse the base oil in the aqueous phase of the emulsion. Such a time is ordinarily in the range of 0.01 to 3.5 minutes.

Although any nonionic emulsifying agent can be used to form the soil control emulsion of this invention, the nonionic emulsifying agent preferred is selected from ethylene oxide adducts of octyl and nonyl phenols which have 10 to 40 ethoxy groups therein and mixtures thereof. Thus, according to this invention, ethylene oxide adducts of alkyl phenols have the following formula:

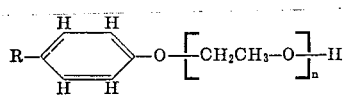

wherein R is an octyl radical ($C_8H_{17}$) or a nonyl radical ($C_9H_{19}$) and n has a value in the range from 10 to 40.

In a preferred embodiment of this invention, the nonionic emulsifying agent used is a mixture of two ethylene oxide adducts of nonyl phenols within the scope of the above formula, wherein the first of the adducts contains 10 to 11 ethoxy groups, that is, $n$ is in the range of from 10 to 11, and further wherein the second adduct contains 40 ethoxy groups, that is, $n$ is 40. In the preferred embodiment utilizing the mixture of nonyl phenols as indicated above, the weight ratio of the adduct having 10 to 11 ethoxy groups to the adduct having 40 ethoxy groups is in the range of 0.5:1 to 2:1.

The adducts used in this invention are well known and readily available commercially. For example, ethylene oxide adducts of nonyl phenols having varying numbers of ethylene oxide units are available commercially under the Triton N series from the Rohm & Haas Company, Philadelphia, Pa., and also under the name "Igepal" available from General Aniline Film Corporation, Dyestuff and Chemical Division, and also from Antara Chemicals. Also, ethylene oxide adducts of octyl phenols are available commercially under the Triton X series of Rohm & Haas. Also, these compounds are readily made by one skilled in the art with techniques well known in the art and therefore, for the sake of brevity, these known techniques will not be discussed in detail.

The asphalt utilized herein, as previously mentioned, is a hard, high specific gravity asphalt. It has a ring-and-ball softening point in the range of 145° to 300°F and preferably 180° to 230°F, a 77°F penetration in the range of 0 to 5 preferably in the range of 2 to 3, and specific gravity measured at 60/60°F in the range of 1.01 to 1.15. Asphalts with softening points, penetrations and specific gravities outside these ranges, however, are also useful and can be combined with the aromatic oil to produce the base oil useful in this invention.

The asphalts useful herein are prepared by processes which are conventional procedures in the petroleum industry. According to one conventional procedure, crude oil is generally subjected to atmospheric distillation to recover separate streams of gases, gasoline, and kerosene. This atmospheric distillation also produces a stream of "residual" material, referred to in the art as topped crude oil, which amounts, for example, up to about 40 percent by volume of the original crude oil. This residual material can then be treated with solvent or it can be subjected to vacuum distillation to recover additional quantities of gas oil. This vacuum distillation also produces a residuum which can be referred to as topped crude oil, although perhaps more specifically it is referred to in the art as vacuum reduced crude oil, which amounts to about 5 to 10 percent by volume of the original crude oil. For the purposes of this application, the term "topped crude oil" shall refer to the materials above defined as residual material and residuum. The topped crude oil is then solvent-treated (extracted) to produce an asphalt of low wax content which is suitable as the asphalt useful herein and the gas oil. The gas oil recovered in this manner is frequently subjected to catalytic cracking to produce lighter hydrocarbons suitable for motor fuel.

The solvent generally used to treat topped crude oil comprises liquid $C_3$—$C_6$ aliphatic hydrocarbons such as propane, butane, pentane, hexane, isobutane, isopentane, isohexane and mixtures thereof. Propane alone or in mixture with one or more of the above-mentioned light hydrocarbon solvents is frequently utilized to deasphalt topped crude oil.

Temperatures in the range of about 90° to 400°F and superatmospheric pressures sufficient to maintain the solvent in liquid phase are generally utilized in the solvent extraction of topped crude oil to produce asphalt.

The aromatic oil useful in the soil control emulsion of this invention preferably has an API gravity of less than 20 at 60°F, a flash point in excess of 550°F, and an aromatic content of at least 30 weight percent and more preferably of at least 50 weight percent of the total weight of the oil. These oils are well known in the art to be the residue produced in the catalytic cracking of oil, that is, the heavy ends of the cracked stream. In a typical process, a heavy oil, such as topped crude oil, vacuum-reduced crude oil, or gas oil, is introduced into a catalytic cracking zone wherein the heavy oil is cracked, thus producing a mixture of lower molecular weight material. This mixture is then fractionated into several components, with the lowest-boiling of these components being an aromatic oil useful in this invention. In addition, the thus-produced aromatic oil can be treated with a solvent, such as sulfur dioxide, furfural or phenol, to extract an oil having a high aromatic ocntent which is also useful in this invention.

The preferred aromatic oil is produced by cracking (and subsequent fractionation of) a heavy oil comprising a mixture of atmospheric gas oil (that is, gas oil produced during the atmospheric distillation of crude oil), vacuum gas oil (that, is gas oil produced during the vacuum distillation of topped crude oil), and solvent-extracted gas oil (that is, gas oil produced during the solvent extraction of vacuum-reduced crude oil). In the preceding statement, the topped crude oil is the bottom product of the atmospheric distillation of crude oil and the vacuum-reduced crude oil is the bottom product of the vacuum distillation of topped crude oil.

In one preferred embodiment of the soil control emulsion of this invention, the weight ratio of base oil to emulsifying solution is approximately 1.42 parts by weight base oil per 1 part by weight emulsifying solution, the weight ratio of asphalt to aromatic oil is approximately 1.35 parts by weight asphalt per 1 part by weight oil, the weight ratio of water to nonionic emulsifying agent is in the range of approximately 12.7 parts by weight water per 1 part by weight emulsifying agent, and the emulsifying agent is a 1:1 weight ratio mixture of ethylene oxide adducts of nonyl phenols wherein one of the adducts contains 10 to 11 ethoxy groups and the other adduct contains 40 ethoxy groups.

In the example which follows and in the specification and claims certain terms of art are used which are defined below as follows:

Penetration: ASTM Test D-561 defines the standard procedure utilized to determine this quantity, which is the most commonly used test for determining the consistency of a material. The penetration of a bituminous material is the distance in tenths of a millimeter that a standard needle penetrates vertically into a sample of the material under fixed conditions of temperature, load and time. Accordingly, soft materials, such as soft asphalts, have high penetration values whereas harder materials, such as harder asphalts, have lower penetration values. The penetration measured at 77°F is the one most commonly reported, which is determined under a load of 100 grams for 5 seconds.

Viscosity: ASTM Test D-8856 defines the test utilized to measure viscosity. The Saybolt Viscometer is the most commonly used instrument, and it provides a means for measuring the time for 60 milliliters of material to flow through a specified orifice at a predetermined temperature. The viscosity of the material is then the number of seconds reported as Saybolt Furol Seconds (SFS) required for the material to run through the orifice.

Softening Point: ASTM Test D-3626 describes the ring-and-ball method (R & B) for determination of the softening point of a material such as an asphalt, which may be defined as that temperature at which an asphalt attains a particular degree of softening under specified conditions of test. The test is performed by placing a steel ball on a mass of material, such as an asphalt, contained in a brass ring and then heating the material until the ball passes through the asphalt. The temperature at which the ball passes through the asphalt is the softening point.

The following experimental runs are provided to further illustrate this invention and are not intended to be unduly limitative thereof.

EXAMPLE

A series of soil control emulsions were prepared utilizing an aromatic oil and an asphalt having the properties shown in Table I below.

TABLE I
Composition and Properties of Aromatic Oil and Asphalt

| Property | Aromatic Oil | Asphalt |
|---|---|---|
| API Gravity, 60°F | 6.8 | -0.02 |
| Viscosity, SFS, 122°F | 27.0 | (a) |
| n-Pentane insolubles, Wt. % | 11.8 | 41.6 |
| Carbon residue, Rams., Wt. % | 7.86 | (a) |
| Ash, Wt. % | 0.052 | 0.25 |
| Aromatics, Wt. % | 75 | (a) |
| No. average molecular weight | 304 | 1440 |
| Specific Gravity, 60/60°F | 1.023 | 1.078 |
| Softening Point, R&B, °F | (a) | 202 |
| Penetration, 77°F, mm/10 | (a) | 0 |
| Elemental Analysis, Wt. % | | |
| Carbon | 89.2 | (a) |
| Hydrogen | 8.7 | |
| Oxygen (by difference) | 0.59 | |
| Nitrogen | 0.09 | |
| Sulfur | 1.42 | |

(a) Not measured.

The aromatic oil and asphalt having the composition shown in Table I above were blended with stirring at a temperature in the range of 275° to 350°F until a homogeneous base oil blend was obtained. A total of six base oils were prepared. The base oil compositions and properties are shown in Table II below.

TABLE II
Composition and Properties of Various Blends of Aromatic Oil and Asphalt

| | Composition | | Blend property | | | |
|---|---|---|---|---|---|---|
| Base oil No. | Asphalt parts by wt. | Oil parts by wt. | Penetration 100/5/77 | Softening point R&B, °F. | Sp. gr. 60/60° F. | API gr. 60° F. |
| 1 | 57.5 | 42.5 | 111 | 113 | 1.045 | 3.9 |
| 2 | 60.0 | 40.0 | 91 | 114 | 1.056 | 2.5 |
| 3 | 62.5 | 37.5 | 76 | 115 | 1.058 | 2.3 |
| 4 | 65.0 | 35.0 | 65 | 117 | 1.059 | 2.1 |
| 5 | 67.5 | 32.5 | 50 | 119 | 1.060 | 1.9 |
| 6 | 70.0 | 30.0 | 39 | 112 | 1.062 | 1.8 |

Base oil 1 Table II above was used to prepare a series of soil control emulsions utilizing different species of nonionic emulsifying agents. In preparing the soil control emulsions, the water and emulsifying agent(s) were first combined in a colloid mill to form an aqueous nonionic emulsifying solution. This operation was conducted at a temperature of approximately 120°F. Thereafter, the base oil, which had been preheated (emulsion 1 - 265°F, emulsion 2 - 267°F, emulsion 3 - 275°F, emulsion 4 - 254°F), was combined with the aqueous nonionic emulsifying solution in the colloid mill. The mill clearance utilized in the colloid mill in all operations was approximately 0.004 inch.

The compositions of the soil control emulsions thus prepared are provided in Table III below.

TABLE III
Nonionic Dust Control Emulsion Compositions

| Emulsion No. | Base oil | Water | Nonionic emulsifier A [1] | B [2] | C [3] | Emulsion stability [4] Immediately after milling | 72 hours after milling |
|---|---|---|---|---|---|---|---|
| 1 | 61.3 | 35.8 | 2.9 | 0 | 0 | E | E |
| 2 | 59.5 | 37.5 | 0 | 3.0 | 0 | I | |
| 3 | 60.8 | 36.3 | 0 | 0 | 2.9 | E | E |
| 4 | 58.8 | 38.2 | 0 | 1.5 | 1.5 | E | E |

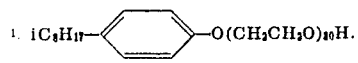

1. iC₉H₁₉—⟨ ⟩—O(CH₂CH₂O)₁₀H.

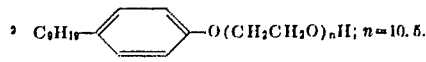

2. C₉H₁₉—⟨ ⟩—O(CH₂CH₂O)ₙH; n=10.5.

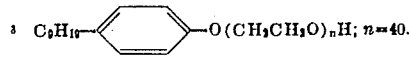

3. C₉H₁₉—⟨ ⟩—O(CH₂CH₂O)ₙH; n=40.

4. E = excellent stability upon visual inspection; I = emulsion broke after milling.

Emulsions 1, 3 and 4 shown in Table III above were evaluated for dust control utility according to the following procedure. Each emulsion was poured on the surface of a 1-inch-diameter column of dry river sand and the depth of penetration was measured as a function of total contact time. The sand in the columns filled the columns to a depth of 32 inches. All of each emulsion, which was used in concentrated form, that is, in the form shown in Table III, was poured in its respective column as rapidly as possible. The quantity of emulsion utilized in each evaluation was constant at 100 milliliters. The results of the penetration evaluation are shown in Table IV below.

TABLE IV

Penetration of Dry River Sand by Nonionic Emulsion

| Penetration Time, Minutes | Penetration Depth, Inches | | |
|---|---|---|---|
| | Emulsion 1 | Emulsion 3 | Emulsion 4 |
| 1 | 0.6 | 0.25 | 1.5 |
| 2 | 0.8 | - | 2.0 |
| 3 | 1.0 | 0.3 | 2.4 |
| 4 | 1.0 | - | 2.75 |
| 5 | 1.2 | 0.4 | 3.0 |
| 6 | 1.3 | 0.5 | 3.2 |
| 7 | 1.4 | 0.5 | 3.4 |
| 8 | 1.6 | 0.5 | 3.7 |
| 9 | 1.6 | 0.6 | 3.9 |
| 10 | 1.8 | 0.6 | 4.1 |
| 15 | 2.2 | 0.7 | 4.8 |
| 20 | 2.4 | 0.8 | 5.4 |
| 25 | 2.7 | 0.9 | 5.9 |
| 30 | 3.0 | 1.0 | 6.3 |
| 35 | 3.2 | 1.0 | 6.6 |
| 40 | 3.4 | 1.1 | 6.9 |
| 50 | 3.8 | 1.2 | 7.4 |
| 60 | 4.1 | 1.3 | 7.8 |
| 80 | 4.5 | 1.3 | 8.5 |
| 100 | 4.8 | 1.3 | 8.9 |
| 140 | 5.1 | 1.5 | 9.6 |
| 180 | 5.5 | 1.7 | 10.1 |

The results in Table IV indicate that emulsion 4 (prepared by a mixture of one polyethoxylated nonyl phenol having 10.5 ethylene oxide units and one polyethoxylated nonyl phenol having 40 ethoxy units) was most effective of the three products tested for penetrating dry river sand and would be expected to provide the best dust protection when used with a variety of other soils, since nonionic emulsions are also insensitive to the surface charge of the aggregate or soil. While the polyethoxylated nonyl phenol having 10.5 ethoxy units did not produce a stable emsulsion when used as the sole emulsifying agent (see Table III, emulsion 2), it is significant that a mixture of this nonyl phenol and that nonyl phenol having 40 ethoxy units (emulsion 4, Table III) resulted in an emulsion which penetrated the soil to a greater depth than similar nonionic emulsions (for example, emulsion 1 and emulsion 3). A plot of the results of Table IV would more clearly indicate the superiority of emulsion 4 utilizing the mixture of polyethoxylated nonyl phenols.

Reasonable variations and modifications are possible within the scope of this disclosure without departing from the spirit and scope thereof.

What is claimed is:

1. A soil control emulsion comprised of a base oil dispersed in an aqueous nonionic emulsifying solution wherein said base oil is a blend of a hard, high specific gravity asphalt having a specific gravity measured at 60/60°F in the range of 1.01 to 1.15, a softening point in the range of 145° to 300°F, and a 77°F penetration in the range of 0 to 5; and a highly aromatic oil having an aromatic content of at least 30 weight percent of the total weight of the oil, and API gravity at 60°F. of less than 20, and a flash point in excess of 550°F and said emulsifying solution is comprised of water and a nonionic emulsifying agent consisting of a mixture of two ethylene oxide adducts of nonyl phenols wherein the first of said adducts contains 10–11 ethoxy groups and the second of said adducts contains 40 ethoxy groups, wherein the weight ratio of said base oil to said emulsifying solution is in the range of 1.25:1 to 3.3:1 parts by weight base oil per 1 part by weight emulsifying solution, wherein the weight ratio of said asphalt to said aromatic oil is in the range of 0.5:1 to 3:1 parts by weight asphalt to 1 part by weight oil, and wherein the weight ratio of said water to said nonionic emulsifying agent is in the range of 5:1 to 20:1 parts by weight water per 1 part by weight emulsifying agent.

2. The soil control emulsion of claim 1 wherein the weight ratio of said first adduct to said second adduct is in the range of 0.5:1 to 2:1 parts by weight of said first adduct per 1 part by weight of said second adduct.

* * * * *